UNITED STATES PATENT OFFICE.

THOMAS S. LAMBERT AND JOHN S. HUYLER, OF NEW YORK, N. Y.

HYGIENIC OATMEAL CONFECTION.

SPECIFICATION forming part of Letters Patent No. 234,298, dated November 9, 1880.

Application filed August 4, 1880. (No specimens.)

*To all whom it may concern:*

Be it known that we, THOMAS S. LAMBERT and JOHN S. HUYLER, both citizens of the United States, residing at New York, in the county of New York and State of New York, have invented new and useful Improvements in Hygienic Oatmeal Confections, of which the following is a specification.

The object of our invention is to produce a hygienic compound having great nutritive value, and also possessing anti-aperient properties in case of persons subject to a looseness of their bowels produced by a change of water incident to their removal from one section of country to another, and which compound shall also be very palatable.

To attain these results we have produced a compound consisting of the following ingredients, combined in the following proportions, or thereabout: sugar, ten (10) pounds; oatmeal, five (5) pounds; water, two (2) pounds. In some instances honey, molasses, or other saccharine substances may take the place of the sugar, in part or in whole. Any desirable flavor may be added.

In preparing this compound the sugar and the water are usually first combined and then subjected to the action of heat in order to dissolve the sugar and to cook it at a temperature, say, of about 240° Fahrenheit in summer, and ranging down to 225° Fahrenheit in winter. The oatmeal is then added and thoroughly stirred through the dissolved sugar and water, and cooked therewith for about fifteen (15) minutes in case of steam-cooked oatmeal (which is best) being used. That of the Cereal Company of New York, cooked at 250° to 350° of temperature, may be indicated as that preferred and used by applicants at present. If the usual oatmeal is used, the time during which it should be cooked with the sugar and water must vary with the degree and the manner with which the oatmeal has been previously cooked by kiln-drying or the like process. The temperature should usually in this case be raised about 20° and the proportion of water increased about twenty-five to thirty-three per cent., after which the mixture is allowed to cool. It will then be in the form of a confection more or less solid according to the proportion of water present in the composition, and also according to the cooking process to which the sugar and water and the sugar, the water, and the oatmeal combined have been subjected.

It is evident that the proportion of water and time of cooking may be varied according to the degree of solidity or hardness required for the confection.

A confection composed of these ingredients may, if sufficiently hard, be made into any form of bonbons, sticks, wafers, lozenges, pellets, lumps, or the like, to be eaten or to be dissolved in water or other drinks.

Having fully described our invention, what we claim is—

The herein-described compound or confection composed of oatmeal, sugar or other saccharine substance, and water, prepared and combined in the manner substantially as specified.

In testimony whereof we have hereunto set our hands in the presence of two subscribing witnesses.

T. S. LAMBERT.
JNO. S. HUYLER.

Witnesses to the signature of Thomas S. Lambert:
    JAMES L. NORRIS,
    J. A. RUTHERFORD.

Witnesses to the signature of John S. Huyler:
    SPENCER C. DOTY,
    W. HARRY PASTOR.